US012675022B2

(12) United States Patent
Kim et al.

(10) Patent No.: US 12,675,022 B2
(45) Date of Patent: Jul. 7, 2026

(54) LIGHT PATH CONTROL MEMBER, DISPLAY DEVICE INCLUDING SAME, AND METHOD FOR MANUFACTURING LIGHT PATH CONTROL MEMBER

(71) Applicant: LG Display Co., Ltd., Seoul (KR)

(72) Inventors: Junehwan Kim, Paju-si (KR); Jungim Hwang, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 287 days.

(21) Appl. No.: 18/518,330

(22) Filed: Nov. 22, 2023

(65) Prior Publication Data

US 2024/0201558 A1 Jun. 20, 2024

(30) Foreign Application Priority Data

Dec. 19, 2022 (KR) ........................ 10-2022-0178146

(51) Int. Cl.
*G02F 1/29* (2006.01)

(52) U.S. Cl.
CPC ..................................... *G02F 1/29* (2013.01)

(58) Field of Classification Search
CPC .......... G02F 1/29; G02F 1/1323; G02F 1/165; G02F 1/167; G02F 1/16755; G02F 1/139; G02F 1/13756; G02F 1/1677; G02F 1/1685; G02F 2201/44; H10K 59/126; H10K 59/50; H10K 59/875; H10K 59/879

USPC ........ 350/315, 316, 317, 319, 320; 359/315, 359/316, 317, 319, 320
See application file for complete search history.

(56) References Cited

U.S. PATENT DOCUMENTS

2021/0191223 A1* 6/2021 Liao ...................... G02B 26/005
2023/0121668 A1* 4/2023 Wang ...................... G02F 1/167
345/691

FOREIGN PATENT DOCUMENTS

KR 20210043149 A 4/2021
KR 20210138302 A 11/2021

* cited by examiner

*Primary Examiner* — Angela M. Medich
(74) *Attorney, Agent, or Firm* — Seed Intellectual Property Law Group LLP

(57) ABSTRACT

A light path control member according to one embodiment includes a first substrate; a first electrode disposed on the first substrate; a light conversion unit disposed on the first electrode; a second electrode disposed on the light conversion unit; and a second substrate disposed on the second electrode. The light conversion unit includes a light transmitting part, a high reflective part around the light transmitting part, and a transmittance variable part between the light transmitting part and the high reflective part. The light transmittance of the transmittance variable part is changed based on the voltage applied.

19 Claims, 8 Drawing Sheets

LIGHT PATH CONTROL MEMBER, DISPLAY DEVICE INCLUDING SAME, AND METHOD FOR MANUFACTURING LIGHT PATH CONTROL MEMBER

CROSS REFERENCE TO RELATED APPLICATION

The present application claims priority to Korean Patent Application No. 10-2022-0178146, filed Dec. 19, 2022, the entire contents of which is incorporated herein for all purposes by this reference.

BACKGROUND

Technical Field

The disclosure relates to a light path control member, a display device including the same, and a method for manufacturing a light path control member.

Description of the Related Art

A light-shielding film shields transmitting of light from a light source, and is attached to a front surface of a display panel which is a display device used for a mobile phone, a notebook, a tablet PC, a vehicle navigation device, a vehicle touch, etc., so that the light-shielding film adjusts a viewing angle of light according to an incident angle of light to express a clear image quality at a viewing angle needed by a user when the display transmits a screen.

In addition, the light-shielding film may be used for the window of a vehicle, building or the like to shield outside light partially to prevent glare, or to prevent the inside from being visible from the outside.

BRIEF SUMMARY

The light-shielding film may be a light path conversion member that controls the movement path of light, blocks light in a specific direction, and transmits light in a specific direction. Accordingly, the viewing angle of the user can be controlled by controlling the transmission angle of light through the light-shielding film.

One or more embodiments of the disclosure provide a light path control member with improved left and right viewing angles in a second mode (e.g., share mode).

One or more embodiments of the disclosure provide a method for manufacturing a light path control member with improved left and right viewing angles in a second mode (share mode).

One or more embodiments of the disclosure provide a display device with improved left and right viewing angles in a second mode (share mode).

The technical benefits offered by the disclosure is not limited to the above-mentioned technical benefits, and other technical benefits not mentioned can be clearly understood by those skilled in the art from the description below.

A light path control member according to one embodiment includes a first substrate; a first electrode disposed on the first substrate; a light conversion unit disposed on the first electrode; a second electrode disposed on the light conversion unit; and a second substrate disposed on the second electrode, wherein the light conversion unit includes a light transmitting part, a high reflective part around the light transmitting part, and a transmittance variable part between the light transmitting part and the high reflective part, wherein light transmittance of the transmittance variable part is changed according to application of a voltage.

A method for manufacturing a light path control member according to one embodiment includes the steps of disposing a first electrode on a first substrate; forming a light alignment polymer material layer on the first electrode; forming a plurality of openings from a surface of the light alignment polymer material layer; forming a high refractive part around the light alignment polymer material layer from the light alignment polymer material layer; disposing a transmittance variable part in the openings; disposing a second electrode on the transmittance variable part, the high refractive part, and the light alignment polymer material layer; and disposing a second substrate on the second electrode, wherein the transmittance variable part is disposed between the light alignment polymer material layer and the high reflective part, wherein light transmittance of the transmittance variable part is changed according to application of a voltage.

A display device according to one embodiment includes a display panel; and a light path control member on the display panel, wherein the light path control member includes a first substrate, a first electrode disposed on the first substrate, a light conversion unit disposed on the first electrode, a second electrode disposed on the light conversion unit, and a second substrate disposed on the second electrode, wherein the light conversion unit includes a light transmitting part, a high reflective part around the light transmitting part, and a transmittance variable part between the light transmitting part and the high reflective part, wherein light transmittance of the transmittance variable part is changed according to application of a voltage.

Other details of embodiments are included in detailed descriptions and drawings.

According to the light path control member, the display device, and the manufacturing method of the light path control member according to the embodiments, a viewing angle control layer and a phase retardation layer can be integrated to reduce overall thickness.

The effects of the embodiments are not restricted to the one set forth herein, and more various effects are included in the specification.

DETAILED DESCRIPTION

Figures 1, 2:
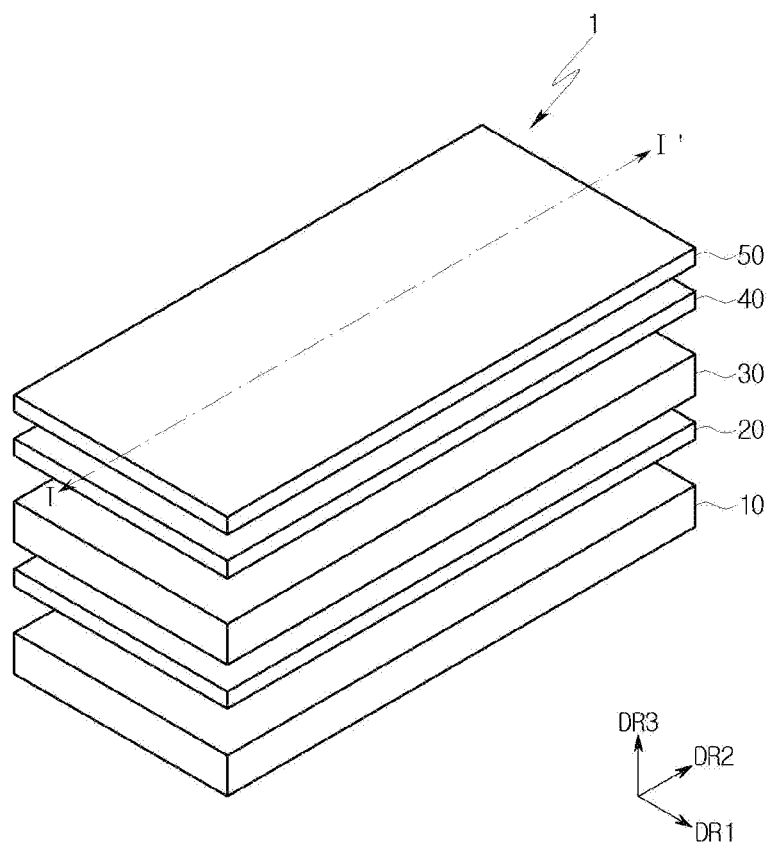
FIG. 1 is an exploded perspective view of a light path control member according to an embodiment.
FIG. 2 is a cross-sectional view taken along the line I-I' in FIG. 1.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure.

Cases where elements or layers are referred to as being located "on" other elements or layers include all the cases where other layers or other elements are interposed directly on or between other elements. Same reference numerals refer to the same constituent elements throughout the specification. The shapes, sizes, ratios, angles, numbers, and the like, inscribed in the drawings to illustrate embodiments are illustrative only, and the disclosure is not limited to the illustrated in the drawings.

It will be understood that, although the terms first, second, etc., may be used herein to describe various elements, these elements should not be limited by these terms. These terms are only used to distinguish one element from another element. Thus, a first element discussed below could be termed a second element without departing from the teachings of the present disclosure.

Features of various embodiments of the disclosure may be partially or overall coupled to or combined with each other, and may be variously inter-operated with each other and driven technically. The embodiments of the disclosure may be carried out independently from each other, or may be carried out together in co-dependent relationship.

Exemplary embodiments will hereinafter be described in detail with reference to the accompanying drawings.

Figure 3:
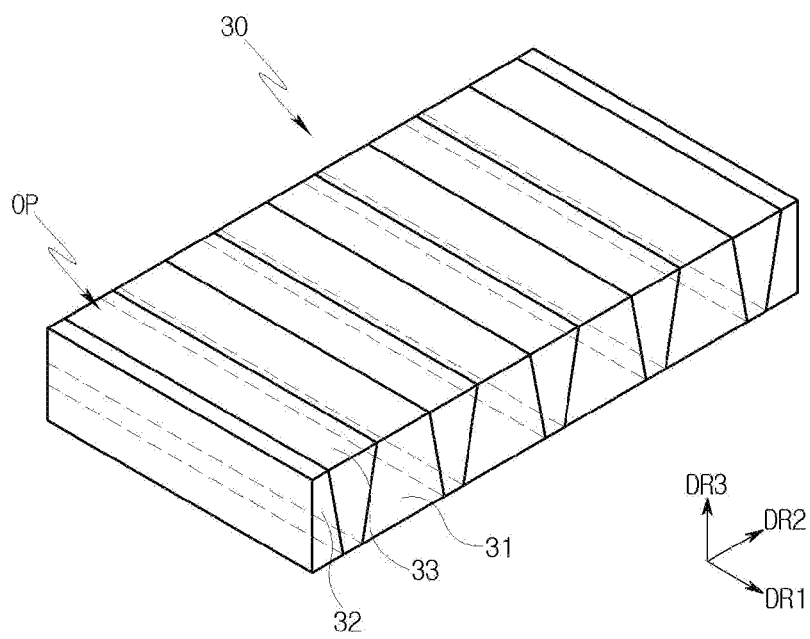
FIG. 3 is a perspective view of the viewing angle control layer of FIG. 1.
Figure 4:
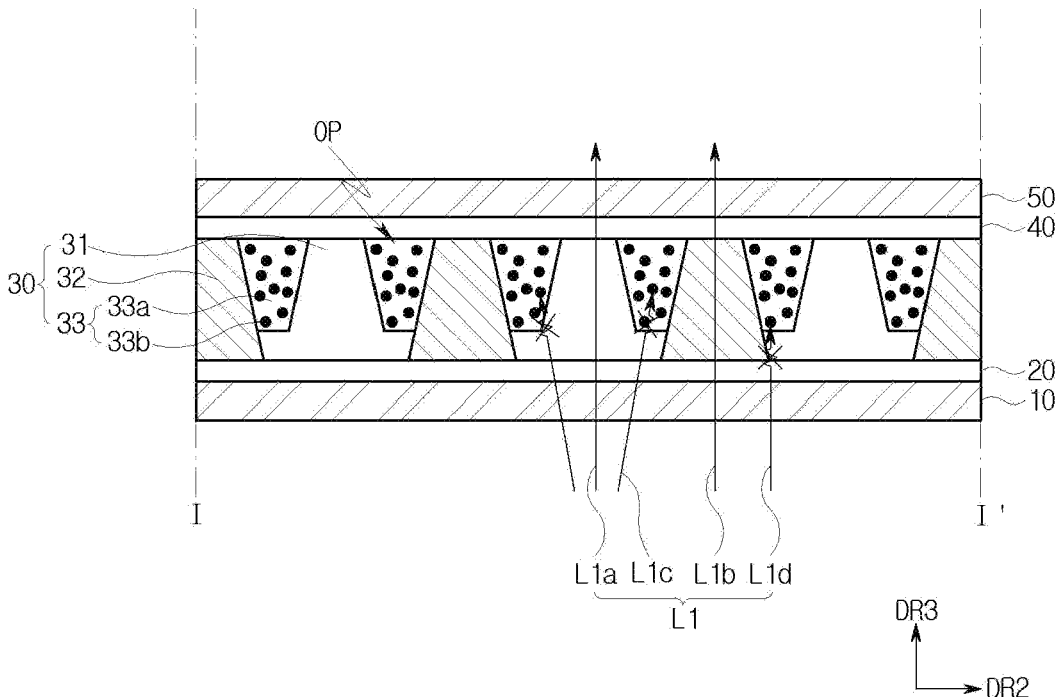
FIG. 4 is a schematic view illustrating a viewing angle control function of the light path control member of FIG. 2 in a first mode.
Figure 5:
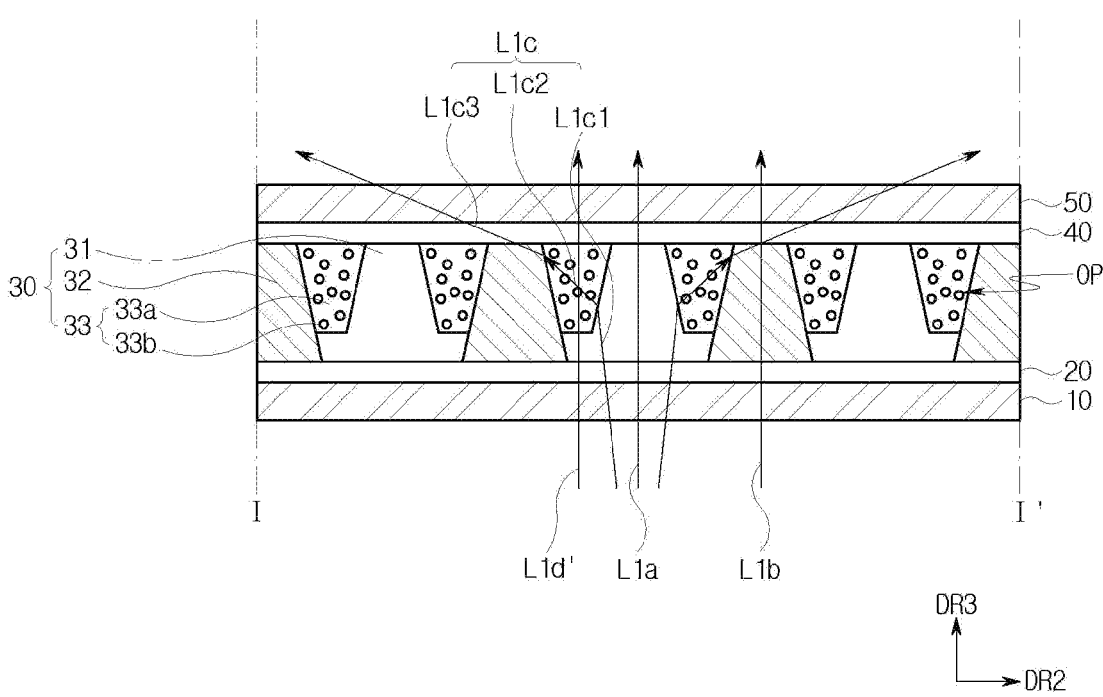
FIG. 5 is a schematic view illustrating a viewing angle control function of the light path control member of FIG. 2 in a second mode.

FIG. 1 is an exploded perspective view of a light path control member according to an embodiment. FIG. 2 is a cross-sectional view taken along the line I-I' in FIG. 1. FIG. 3 is a perspective view of the viewing angle control layer of FIG. 1. FIG. 4 is a schematic view illustrating a viewing angle control function of the light path control member of FIG. 2 in a first mode. FIG. 5 is a schematic view illustrating a viewing angle control function of the light path control member of FIG. 2 in a second mode.

Referring to FIGS. 1 to 5, a light path control member 1 according to one embodiment includes a first substrate 10, a first electrode 20 on the first substrate 10, a light conversion unit 30 on the first electrode 20, a second electrode 40 on the light conversion unit 30, and a second substrate 50 on the second electrode 40. The light conversion unit 30 may be disposed between the first electrode 20 and the second electrode 40.

The first substrate 10 may support the first electrode 20. The first substrate 10 may be rigid or flexible.

Also, the first substrate 10 may be transparent. For example, the first substrate 10 may include a transparent substrate capable of transmitting light.

The first substrate 10 may include glass, plastic or a flexible polymer film. For example, the flexible polymer film may be made of any one of polyethylene terephthalate (PET), polycarbonate (PC), acrylonitrile-butadiene-styrene copolymer (ABS), polymethyl methacrylate (PMMA), polyethylene naphthalate (PEN), polyether sulfone (PES), cyclic olefin copolymer (COC), triacetylcellulose (TAC) film, polyvinyl alcohol (PVA) film, polyimide (PI) film, and polystyrene (PS), which is only an example, but the embodiment is not limited thereto.

In addition, the first sub substrate 10 may be a flexible substrate having flexible characteristics.

In addition, the first substrate 10 may be a curved or bent substrate. That is, the light path control member including the first substrate 10 may be formed to have a flexible, curved or bended characteristics. For this reason, the light path control member according to the embodiment may be changed into various designs.

The first substrate 10 may have a thickness of about 1 mm or less.

The first electrode 20 may be disposed on one surface of the first substrate 10. More specifically, the first electrode 20 may be disposed on the upper surface of the first substrate 10. That is, the first electrode 20 may be disposed between the first substrate 10 and the second substrate 50.

The first electrode 20 may include a transparent conductive material. For example, the first electrode 20 may include metal oxide such as indium tin oxide, indium zinc oxide, copper oxide, tin oxide, zinc oxide, titanium oxide, etc.

The first electrode 20 may be disposed on the first substrate 10 in a film shape. In addition, the light transmittance of the first electrode 20 may be about 80% or more. More specifically, the first electrode 20 may be disposed on the entire surface of one surface of the first substrate 10. That is, the first electrode 20 may be disposed as a surface electrode on the first substrate 10.

The first electrode 20 may have a thickness of about 10 nm to about 50 nm.

In addition, the first electrode 20 may include various metals to realize low resistance. For example, the first electrode 20 may include at least one metal of chromium (Cr), nickel (Ni), copper (Cu), aluminum (Al), silver (Ag), molybdenum (Mo), gold (Au), titanium (Ti), and alloys thereof.

The first electrode 20 may be disposed on the entire surface of one surface of the first substrate 10. In detail, the first electrode 20 may be disposed as a surface electrode on one surface of the first substrate 10, However, the embodiment is not limited thereto, and the first electrode 20 may be formed of a plurality of pattern electrodes having a predetermined pattern.

The second substrate 50 may be disposed on the first substrate 10. The second substrate 50 may face the first substrate 10.

The second substrate 50 may include a material capable of transmitting light. The second substrate 50 may include a transparent material. The second substrate 50 may include the same or similar material as the first substrate 10 described above.

The second substrate 50 may include a material capable of transmitting light. The second substrate 50 may include a transparent material. The second substrate 50 may include the same or similar material as the first substrate 10 described above.

For example, the second substrate 50 may include glass, plastic, or a flexible polymer film. For example, the flexible polymer film may be made of any one of polyethylene terephthalate (PET), polycarbonate (PC), acrylonitrile-butadiene-styrene copolymer (ABS), polymethyl methacrylate (PMMA), polyethylene naphthalate (PEN), polyether sulfone (PES), cyclic olefin copolymer (COC), triacetylcel-lulose (TAC) film, polyvinyl alcohol (PVA) film, polyimide (PI) film, and polystyrene (PS), which is only an example, but the embodiment is not limited thereto.

In addition, the second substrate 50 may be a flexible substrate having flexible characteristics.

Further, the second substrate 50 may be a curved or bended substrate. That is, the light path control member including the second substrate 50 may also be formed to have flexible, curved, or bent characteristics. Accordingly, the light path control member according to the embodiment may be changed to various designs.

The second substrate 50 may have a thickness of about 1 mm or less.

The second electrode 40 may be disposed on one surface of the second substrate 50. In detail, the second electrode 40 may be disposed on a lower surface of the second substrate 50. That is, the second oxide, copper oxide, tin oxide, zinc oxide, titanium oxide, etc.

The second electrode 40 may be disposed on the second substrate 50 in a film shape. In addition, the light transmit-tance of the second electrode 40 may be about 80% or more. More specifically, the second electrode 40 may be disposed on the entire surface of one surface of the second substrate 50. That is, the second electrode 40 may be disposed as a surface electrode on the second substrate 50.

The second electrode 40 may have a thickness of about 10 nm to about 50 nm.

In addition, the second electrode 40 may include various metals to realize low resistance. For example, the second electrode 40 may include at least one metal of chromium (Cr), nickel (Ni), copper (Cu), aluminum (Al), silver (Ag), molybdenum (Mo), gold (Au), titanium (Ti), and alloys thereof.

The second electrode 40 may be disposed on the entire surface of one surface of the second substrate 50. In detail, the second electrode 40 may be disposed as a surface electrode on one surface of the second substrate 50, How-ever, the embodiment is not limited thereto, and the second electrode 40 may be formed of a plurality of pattern elec-trodes having a predetermined pattern.

The light conversion unit 30 may be disposed between the first substrate 10 and the second substrate 50. In detail, the light conversion unit 30 may be disposed between the first electrode 20 and the second electrode 40.

The light conversion unit 30 may include a light trans-mitting part 31, a high refractive part 32 around the light transmitting part 31, and a transmittance varying part 33 between the light transmitting part 31 and the high refraction unit 32. The light transmittance of the transmittance variable part 33 may be changed according to the application of voltage. The light transmitting part 31 may be disposed between the adjacent high refractive parts 32. The high refractive part 32 may be disposed between the light trans-mitting parts 31.

The light transmitting part 31 of the light conversion unit 30 may have a first thickness t1, and the transmittance variable part 33 may have a second thickness t2. The second thickness t2 may be smaller than the first thickness t1. The first thickness t1 may be about 60 um to about 120 um.

For example, the high refractive part 32 may have a first width W1, and the transmittance variable part 33 may have a second width W2. The first width W1 may be larger than the second width W2, but is not limited thereto.

For example, the cross-section of the high refractive part 32 may be a trapezoidal shape. That is, in the high refractive part 32, the width of an upper surface may be smaller than the width of a lower surface.

However, the embodiment is not limited thereto, and the cross-section of the high refractive part 32 may be an inverted trapezoidal shape, a rectangular shape, a square shape, or other polygonal shapes.

For example, the cross-section of the transmittance vari-able part 33 may be an inverted trapezoidal shape. That is, in the transmittance variable part 33, the width of an upper surface may be greater than the width of a lower surface.

The light transmitting part 31 may include an opening OP. A cross-section of the opening OP may be the same as that of the transmittance variable part 33. The cross-section of the opening OP is not limited thereto, and may be a trapezoidal shape, a rectangular shape, a square shape, or other polygonal shapes.

The opening OP may be formed from a surface of the light transmitting part 31.

For example, the opening OP may be formed to be recessed in the thickness direction from the upper surface of the light transmitting part 31.

One side surface of the transmittance variable part 33 may be in contact with the adjacent high refractive part 32, and the other side surface of the transmittance variable part 33 may be in contact with the adjacent light transmitting part 31. A lower surface of the transmittance variable part 33 may be in contact with the light transmitting part 31. An upper surface of the transmittance variable part 33 may be in contact with the second electrode 40.

The side surfaces of the high refractive part 32 may be in contact with the adjacent transmittance variable part 33. The lower surface of the high refractive part 32 may be in contact with the first electrode 20 and the upper surface of the high refractive part 32 may be in contact with the second elec-trode 40.

The upper surface of the light transmitting part 31 may be in contact with the second electrode 40, and the lower surface of the light transmitting part 31 may be in contact with the first electrode 20.

As described above, the upper end of the side surface of the high refractive part 32 may be in contact with the transmittance variable part 33, and the lower end of the side surface of the high refractive part 32 may be exposed by the high refractive part 32 and be in contact with the light transmitting part 31.

The light transmitting part 31 may transmit light provided from a lower part to an upper part. The light transmitting part 31 may include a transparent material. The light transmitting part 31 may include a material capable of transmitting light.

The light transmitting part 31 may include a light align-ment polymer material. Since the light transmitting part 31 is formed by curing the light alignment polymer material, it can be considered that the light transmitting part 31 itself includes the light alignment polymer material.

The light transmitting part 31 may transmit light incident on any one of the first substrate 10 and the second substrate 50 toward the other substrate.

For example, as illustrated in FIGS. 4 and 5, the light transmitting part 31 may transmit some light L1a of the first light L1 provided from the lower part of the first substrate 10 upward. Hereinafter, a mode in which a side viewing angle is limited as illustrated in FIG. 4 will be referred to as a first mode, and a mode in which a side viewing angle is wide as illustrated in FIG. 5 will be referred to as a second mode.

As illustrated in FIG. 3, the transmittance variable part 33 may have a line shape extending along a first direction DR1 and may be provided in plurality. The plurality of transmittance variable parts 33 may be spaced apart from each other along a second direction DR2.

The alignment direction of the light absorbing particle 33b of the transmittance variable part 33 of the light conversion part 30 changes according to the formation of the electric field by the electrodes 20 and 40, so that the light transmittance of the transmittance variable part 33 may change.

The transmittance variable part 33 may include a dispersion solution 33a and the light absorbing particle 33b. More specifically, the transmittance variable part 33 is filled with the dispersion solution 33a to be inserted, and a plurality of light absorbing particles 33b may be dispersed in the dispersion solution 33a.

The dispersion solution 33a may be a material that disperses the light absorbing particles 33b. The dispersion solution 33a may include a transparent material. The dispersion solution 33a may include a non-polar solvent. In addition, the dispersion solution 33a may include a material capable of transmitting light. For example, the dispersion solution 33a may include at least one of halocarbon-based oil, paraffin-based oil, and isopropyl alcohol.

The light absorbing particles 33b may be disposed to be dispersed in the dispersion solution 33a. More specifically, the plurality of light absorbing particles 33b may be disposed to be spaced apart from each other in the dispersion solution 33a.

The light transmittance of the transmittance variable part 33 may be changed by the light absorbing particle 33b. More specifically, the light transmittance of the transmittance variable part 33 is changed by the light absorbing particles 33b, so that the transmittance variable part 33 may be changed into a light blocking part and a light transmitting part.

For example, a light path member according to an embodiment may be changed from a first mode to a second mode or from a second mode to a first mode by a voltage applied to the first electrode 20 and the second electrode 40.

In the light path control member 1 according to an embodiment, the transmittance variable part 33 becomes the light blocking part in the first mode, and light at a specific angle may be blocked by the transmittance variable part 33. That is, the viewing angle (side viewing angle or left and right viewing angles) of the user viewing from the outside may be narrowed.

In addition, in the light path control member 1 according to an embodiment, the transmittance variable part 33 becomes the light transmitting part in the second mode, and in the light path control member 1 according to an embodiment, light may be transmitted through both the light transmitting part 31 and the transmittance variable part 33. That is, the viewing angle (side viewing angle or left and right viewing angles) of the user viewing from the outside may be widened.

Switching from the first mode to the second mode, that is, the conversion of the transmittance variable part 33 from the light blocking part to the light transmitting part may be realized by alignment direction (or extension direction) of the light absorbing particles 33b of the transmittance variable part 33. As a voltage is applied to the electrodes 20 and 40, the alignment direction (or extension direction) of the light absorbing particles 33b is changed, so that the first mode and the second mode can be switched.

More specifically, as illustrated in FIG. 4, in the first mode, no voltage may be applied to the electrodes 20 and 40. When no voltage is applied to the electrodes 20 and 40, an electric field may not be formed in the light conversion unit 30. In this case, the light absorbing particles 33b are dispersed in the dispersion solution 33a, and the user's viewing angle (side viewing angle or left and right viewing angles) may be narrowed by transmitting/blocking the first light L1. The light absorbing particles 33b may have, for example, a nanorod shape extending along one direction. In the first mode, since an electric field is not formed in the light conversion unit 30, the plurality of light absorbing particles 33b is randomly arranged, and among the plurality of light absorbing particles 33b randomly arranged, the light passing through the transmittance variable part 33 (see L1c and L1d among the first lights L1 in FIG. 4) is blocked by the light absorbing particles 33b extending in the second direction DR2, and the light passing through the light transmitting part 31 (see L1a in FIG. 4) and the light passing through the high refractive part 32 (see L1b in FIG. 4) are transmitted, so that the user's viewing angle (side viewing angle or left and right viewing angles) may be narrowed.

On the other hand, as illustrated in FIG. 5, in the second mode, a predetermined voltage is applied to the electrodes 20 and 40, and thus, an electric field may be formed on the light conversion unit 30 from the first electrode 20 to the second electrode 40 or from the second electrode 40 to the first electrode 20. Due to this, the light absorbing particles 33b are dispersed in the dispersion solution 33a, but the alignment direction (or extension direction) of the light absorbing particles 33b may change. For example, the alignment direction of the light absorbing particles 33b_1 may be a direction from the first electrode 20 to the second electrode 40 or a direction from the second electrode 40 to the first electrode 20.

By changing the alignment direction of the light absorbing particles 33b from the first electrode 20 to the second electrode 40 or from the second electrode 40 to the first electrode 20 according to the application of the electric field, as illustrated in FIG. 5, light incident from the lower part of the transmittance variable part 33 (see L1d' in FIG. 5) and light incident on the side surface of the transmittance variable part 33 (see L1c in FIG. 5) may be transmitted, so that the user's viewing angle (side viewing angle or left and right viewing angles) may be widened.

Meanwhile, as illustrated in FIG. 5, another light L1c among the first light L1 may pass through the light transmitting part 31 and be incident on the side surface of the transmittance variable part 33 (see L1c1). The light L1c incident on the side surface of the transmittance variable part 33 is refracted at the interface between the side surface of the transmittance variable part 33 and the light transmitting part 31 and may proceed in a lateral direction (or a direction between the second direction DR2 and the first direction DR1). In order for the light L1c incident on the side surface of the transmittance variable part 33 to be refracted at the interface between the side surface of the transmittance variable part 33 and the light transmitting part 31 and proceed in the lateral direction (or the direction between the second direction DR2 and the first direction), the refractive index of the transmittance variable part 33 may be greater than that of the light transmitting part 31, and the refractive index of the dispersion solution 33a may be greater than the refractive index of the light transmitting part 31.

Meanwhile, the high refractive part 32 may be disposed between the transmittance variable part 33 and the light transmitting part 31. The thickness of the high refractive part

32 may be the same as the first thickness t1 of the light transmitting part 31. The high refractive part 32 may cause the light (See L1c2) refracted at the interface between the side surface of the transmittance variable part 33 and the light transmitting part 31 and proceeded in the lateral direction (or the direction between the second direction DR2 and the first direction DR1) to further proceed from the interface between the high reflective part 32 and the transmittance variable part 33 to the lateral direction (or the direction between the second direction DR2 and the first direction DR1). In order for the high refractive part 32 to cause the light L1c2 to further proceed from the interface between the high refractive part 32 and the transmittance variable part 33 to the lateral direction (or the direction between the second direction DR2 and the first direction DR1) (See L1c3), the refractive index of the high refractive part 32 may be greater than that of the transmittance variable part 33, and the refractive index of the high refractive part 32 may be greater than the refractive index of the dispersion solution 33a.

As illustrated in FIG. 5, the high refractive part 32 transmits the light L1b provided from the lower part to the upper part as it is, but may serve to further proceed the light (see L1c2) refracted at the interface between the side surface of the transmittance variable part 33 and the light transmitting part 31 and proceeded in the lateral direction (or the direction between the second direction DR2 and the first direction DR1) from the interface between the high reflective part 32 and the transmittance variable part 33 to the lateral direction (or the direction between the second direction DR2 and the first direction DR1) (see L1c3).

Accordingly, in the second mode, the left and right viewing angles (or side viewing angles) may be further widened.

For example, the refractive index of the light transmitting part 31 may be about 1.55, the refractive index of the dispersion solution 33a in the transmittance variable part 33 may be about 1.58, and the refractive index of the high refractive part 32 may be about 1.66.

The high refractive part 32 may include a light alignment polymer material. The high refractive part 32 may be a layer formed by irradiating the second light (see L2 in FIG. 9) having a wavelength range of about 280 nm to about 400 nm to the light alignment polymer material to be cured. Since the high refractive part 32 is a layer formed by irradiating the second light L2 having a wavelength range of about 280 nm to about 400 nm to the light alignment polymer material to be cured, it is considered that the high refractive part 32 itself includes the light alignment polymer material.

Hereinafter, a manufacturing method of the light path control member 1 will be described.

FIGS. 6 to 10 are cross-sectional views for respective processes illustrating a method for manufacturing a light path control member according to an embodiment. While describing the manufacturing method of the light path control member with reference to FIGS. 6 to 10, reference may also be made to FIGS. 1 to 5 previously referred to.

Figure 6:
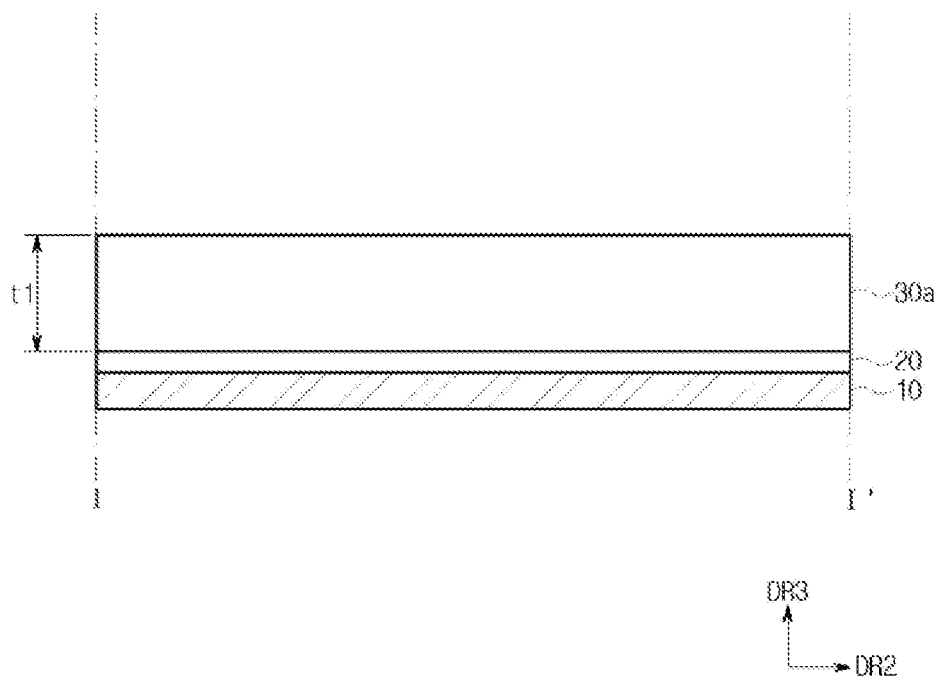
FIGS. 6 to 10 are cross-sectional views for respective processes illustrating a method for manufacturing a light path control member according to an embodiment.

First, as illustrated in FIG. 6, the first electrode 20 is formed on the first substrate 10 and a light alignment polymer material layer 30a is formed on the first electrode 20.

The light alignment polymer material layer 30a may include the light alignment polymer material before curing of the light transmitting part 31 described above, and may include the light alignment polymer material before the light (or second light) irradiation and curing of the high refractive part 32.

Figure 7:
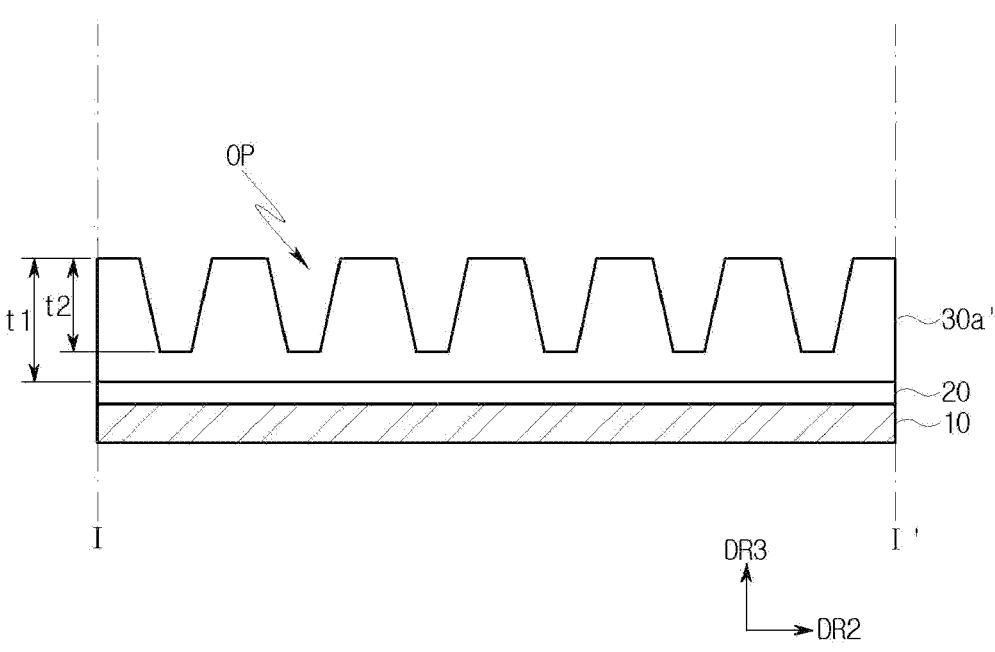

Subsequently, as illustrated in FIG. 7, a plurality of recessed grooves OP (or openings) is formed from the surface (or upper surface) of the light alignment polymer material layer 30a in FIG. 6.

In the step of forming the plurality of recessed grooves, the height t2 of the recessed groove OP of the light alignment polymer material layer 30a' may be formed lower than the height t1 of the light alignment polymer material layer 30a.

Figure 8:
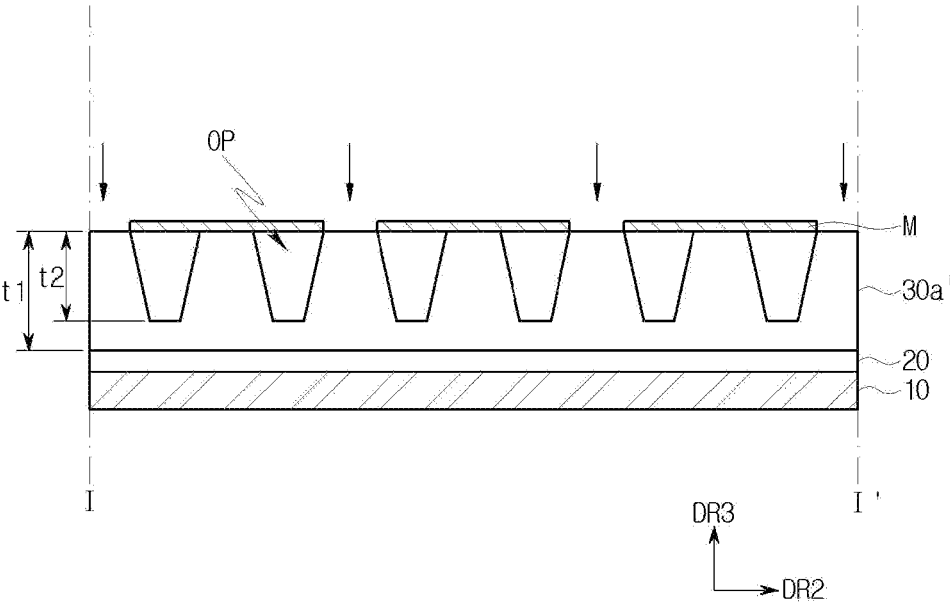
Figure 9:
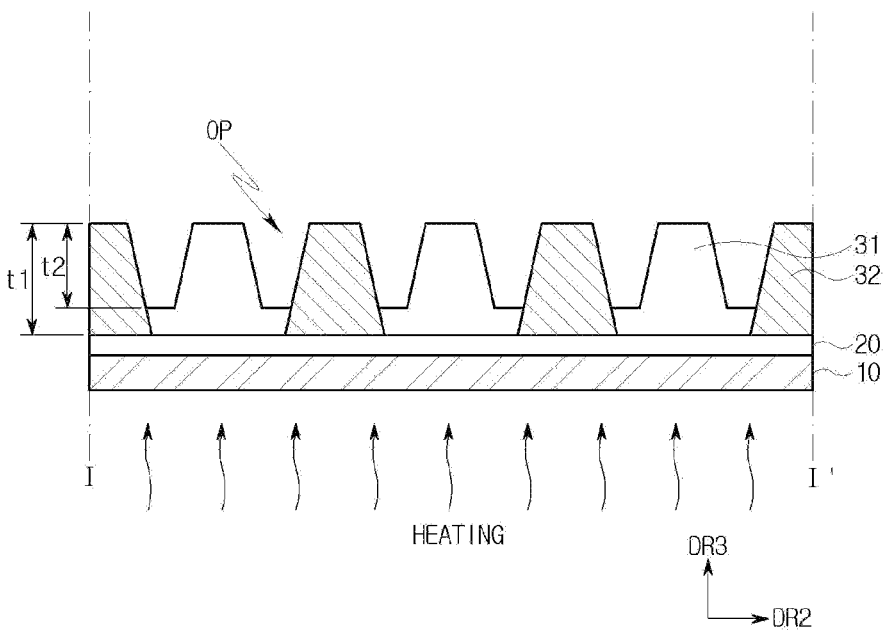

Subsequently, as illustrated in FIGS. 8 and 9, the high refractive part 32 is formed around the light alignment polymer material layer 31 from the light alignment polymer material layer 30a'. In the step of forming the high refractive part 32 around the light alignment polymer material layer 31 from the light alignment polymer material layer 30a', an area in which the high refractive part 32 formed from the light alignment polymer material layer 30a' is excluded may include a light transmitting part (31 in FIG. 2).

The step of forming the high refractive part 32 around the light alignment polymer material layer 31 may include the steps of disposing a mask M on an area that does not overlap with a high refractive part (32 in FIG. 9) on the light alignment polymer material layer 30a' and irradiating light (or the second light L2) to the exposed area using the mask M.

A wavelength range of the second light L2 may be about 280 nm to about 400 nm.

In the step of forming the high refractive part 32 around the light alignment polymer material layer 31 may include, after the step of irradiating light (or the second light L2) to the exposed area using the mask M, the light alignment polymer material layer 31 and the high refractive part 32 are cured. The curing may include light curing or thermal curing (HEATING), but is not limited thereto.

Figure 10:
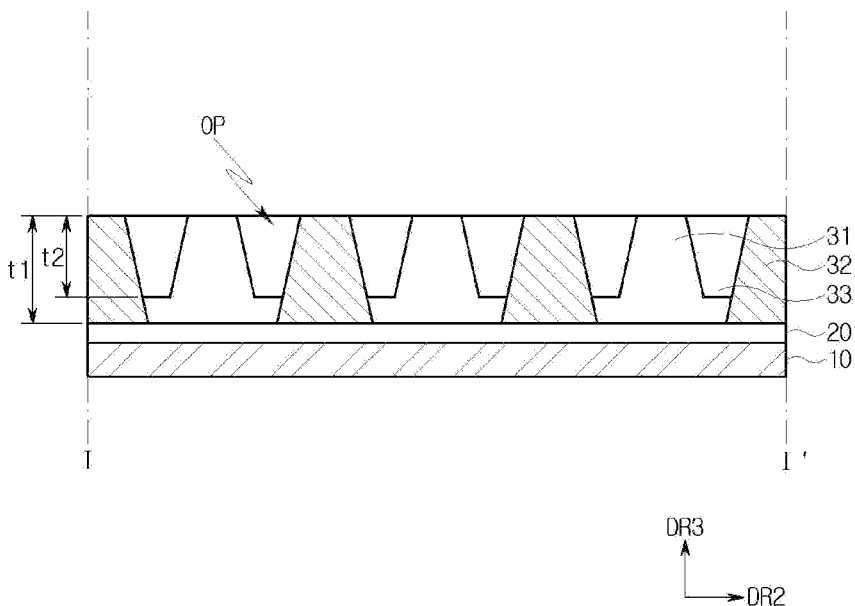

Subsequently, as illustrated in FIG. 10, the transmittance variable part 33 is disposed in the recessed groove OP (or opening).

In the case of this embodiment, since the refractive index of the high refractive part 32 is greater than the refractive index of the transmittance variable part 33 and the refractive index of the high refractive part 32 is greater than the refractive index of the dispersion solution 33a, the left and right viewing angles (or side viewing angles) can be further widened in the second mode.

Hereinafter, other embodiments of the light path control member will be described.

Figure 11:
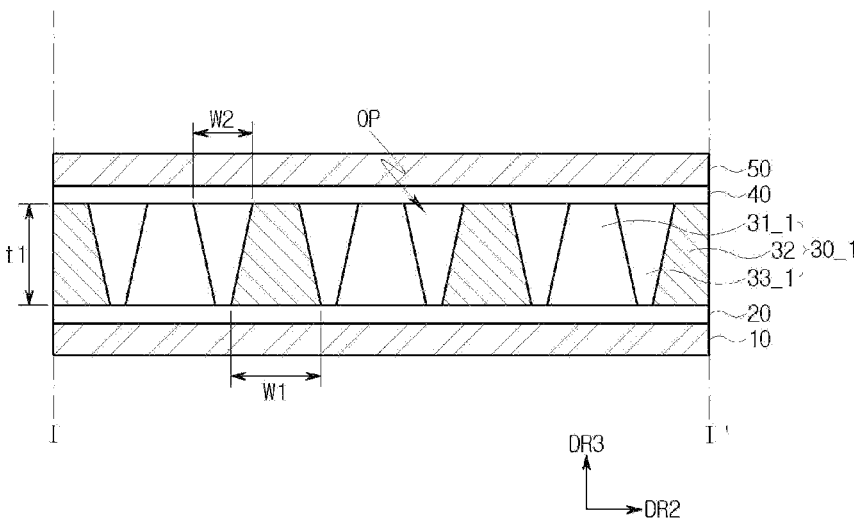
FIG. 11 is a cross-sectional view of a light path control member according to another embodiment.

FIG. 11 is a cross-sectional view of a light path control member according to another embodiment.

Referring to FIG. 11, the light conversion unit according to this embodiment is different from the light conversion unit 30 according to FIG. 2 in that the thickness of the transmittance variable part 33_1 of the light conversion unit 30_1 may be the same as the thickness t1 of the light transmitting part 31_1.

More specifically, the thickness of the transmittance variable part 331 of the light conversion unit 30_1 may be the same as the thickness t1 of the light transmitting part 31_1. The opening OP may completely penetrate from the upper surface to the lower surface of the light transmitting part 31_1. Accordingly, the lower surface of the transmittance variable part 331 may be directly in contact with the first electrode 20.

Since other descriptions are the same as those described above with reference to FIGS. 1 to 5, detailed descriptions thereof will be omitted.

Figure 12:
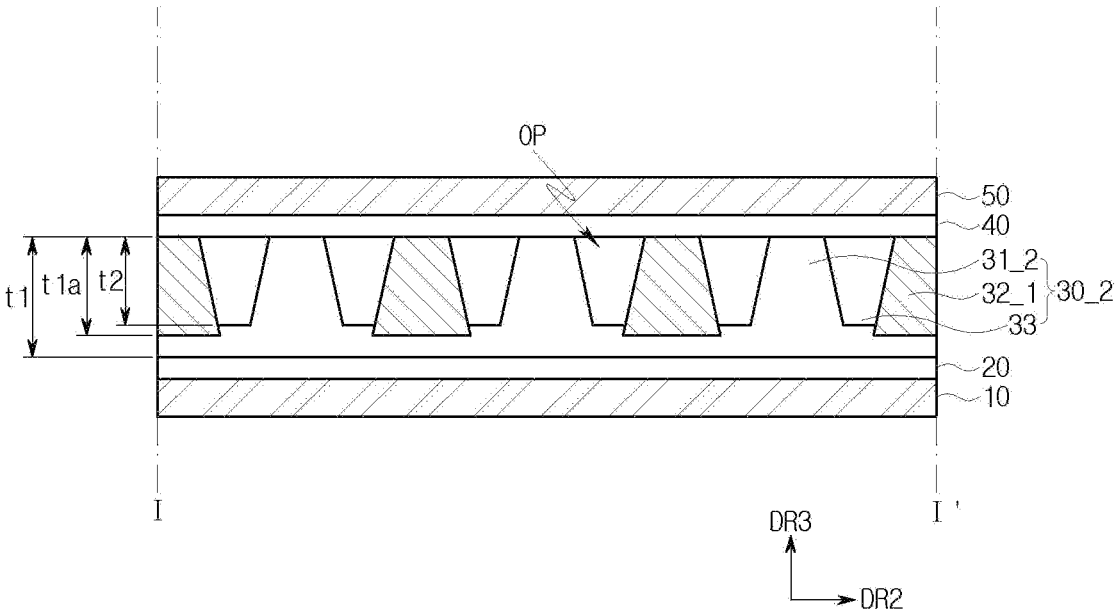
FIG. 12 is a cross-sectional view of a light path control member according to still another embodiment.

FIG. 12 is a cross-sectional view of a light path control member according to another embodiment.

Referring to FIG. 12, the light conversion unit according to this embodiment is different from the light conversion unit 30 according to FIG. 2 in that the thickness t1a of the high refractive part 32_1 of the light path control member is smaller than the thickness t1 of the light transmitting part 312.

The thickness t1a of the high refractive part 321 may be greater than the thickness t2 of the transmittance variable part 33, but is not limited thereto and may be equal to the thickness t2 of the transmittance variable part 33.

In the embodiment, the lower surface of the high refractive part 321 may be in contact with the light transmitting part 312.

In the embodiment, the light path control member may be formed such that in the process of irradiating the second light L2 in FIG. 8, the high refractive part 32_1 is not inadvertently brought into contact with the first electrode 20 due to the intensity of the second light L2 and the deviation of the focusing area.

Since other descriptions are the same as those described above with reference to FIGS. 1 to 5, detailed descriptions thereof will be omitted.

Figure 13:
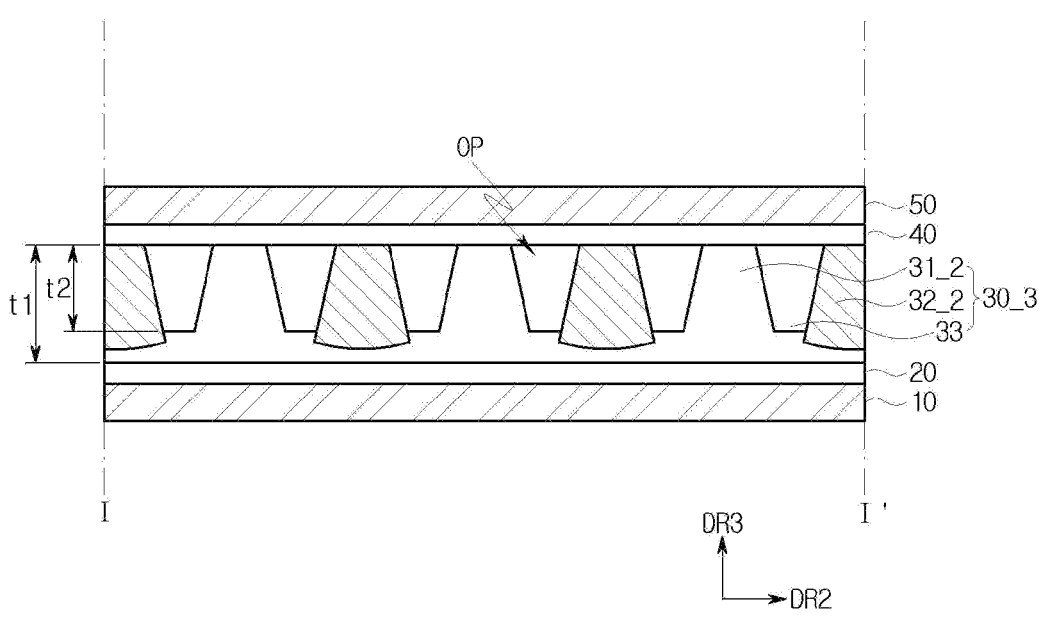
FIG. 13 is a cross-sectional view of a light path control member according to still another embodiment.

FIG. 13 is a cross-sectional view of a light path control member according to another embodiment.

Referring to FIG. 13, the light conversion unit according to this embodiment is different from the light conversion unit 30_2 according to FIG. 12 in that the lower surface of the high reflective part 322 of the light conversion unit 303 may include a curved shape.

In the case of the embodiment, as illustrated in FIG. 12, the light path control member may be also formed such that in the process of irradiating the second light L2 in FIG. 8, the high refractive part 32_2 is not inadvertently brought into contact with the first electrode 20 due to the intensity of the second light L2 and the deviation of the focusing area, and has a curved shape. The curved shape may be a downwardly convex curved shape.

Since other descriptions are the same as those described above with reference to FIG. 12, detailed descriptions thereof will be omitted.

Figure 14:
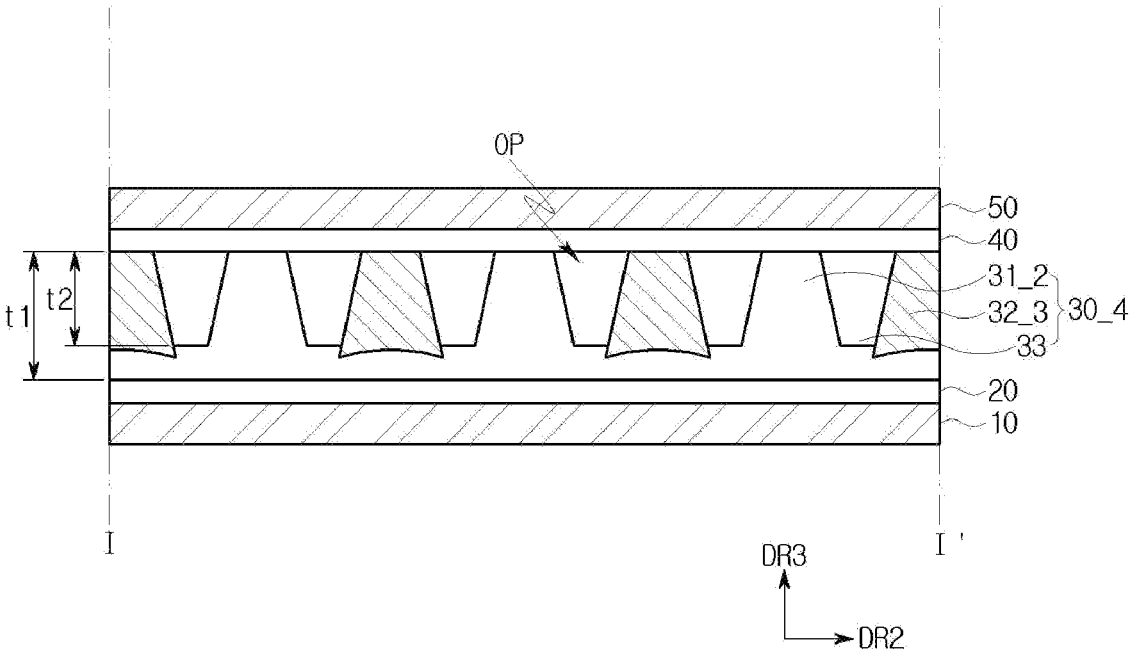
FIG. 14 is a cross-sectional view of a light path control member according to still another embodiment.

FIG. 14 is a cross-sectional view of a light path control member according to another embodiment.

Referring to FIG. 14, the light conversion unit according to this embodiment is different from the light conversion unit 30_3 according to FIG. 13 in that the lower surface of the high refractive part 323 of the light conversion unit 30_4 includes a curved shape, and the curved shape may include a curved shape protruding upward.

In the case of this embodiment, as illustrated in FIG. 13, the light path control member may be also formed such that in the process of irradiating the second light L2 in FIG. 8, the high refractive part 323 is not inadvertently brought into contact with the first electrode 20 due to the intensity of the second light L2 and the deviation of the focusing area, and has an upwardly convex curved shape.

Since other descriptions are the same as those described above with reference to FIG. 13, detailed descriptions thereof will be omitted.

Figure 15:
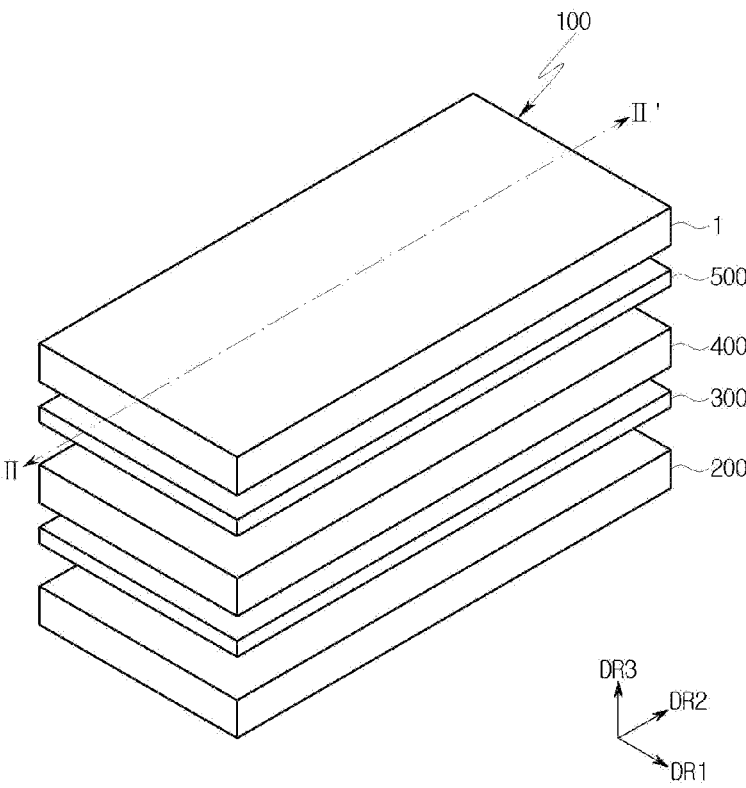
FIG. 15 is a perspective view of a display device according to an embodiment.
Figure 16:
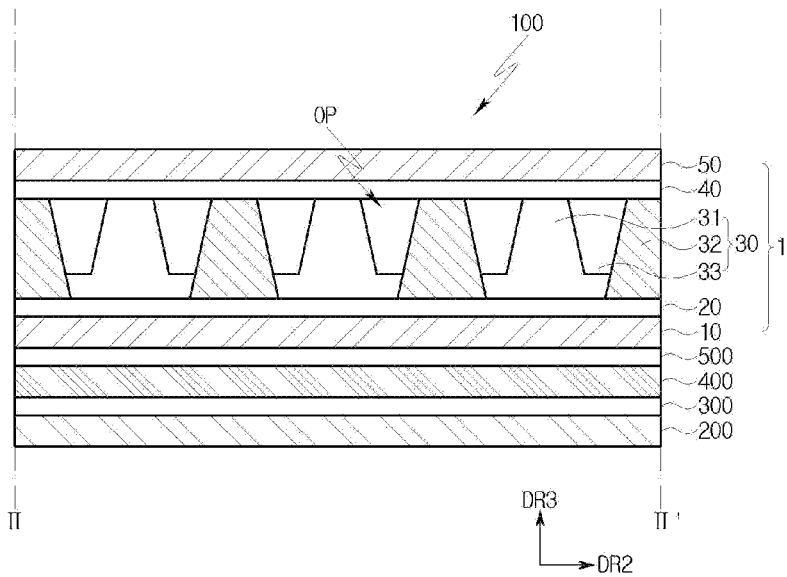
FIG. 16 is a cross-sectional view taken along line II-II' in FIG. 15.

FIG. 15 is a perspective view of a display device according to an embodiment. FIG. 16 is a cross-sectional view taken along line II-II' in FIG. 15.

Referring to FIGS. 15 and 16, a display device 100 according to one embodiment may include a display panel 200 disposed on a lower part of the light path control member 1, a first coupling member 300 between the display panel 200 and the light path control member 1, a polarization film 400 between the first coupling member 300 and the light path control member 1, and a second coupling member 500 between the polarization film 400 and the light path control member 1.

The display panel 200 and the polarization film 400 may be coupled through the first coupling member 300, and the polarization film 400 and the light path control member 1 may be coupled through the second coupling member 500.

The first coupling member 300 may include a light transparent adhesive (OCA) or a light transparent resin (OCR), but is not limited thereto.

The second coupling member 500 may include the light transparent adhesive (OCA), the light transparent resin (OCR) or the like, but is not limited thereto.

The display panel 200 may include a plurality of pixels disposed in a display area of a base substrate and driving units disposed in a non-display area around the display area to drive the pixels. The pixels may include transistors (TFTs) connected to the driving units through a control signal line, and light emitting devices (OLEDs) connected to the transistors. The transistors are turned on or off according to a control signal applied through a control signal line to adjust the amount of current applied to the light emitting element. The light emitting element may emit light with a luminance corresponding to the amount of current applied through the transistor. The display panel 200 may further include a protective layer (Encap) encapsulating the light emitting elements (OLEDs) and an upper protective substrate (Pol). In some embodiments, the display panel 200 may be a liquid crystal display panel.

Although the embodiments of the disclosure have been described above with reference to the accompanying drawings, it will be understood that the technical configuration of the present disclosure may be embodied in other specific forms by those skilled in the art to which the disclosure pertains without changing the technical spirit or essential features of the disclosure. Therefore, it should be understood that the embodiments described above are illustrative in all respects and not restrictive.

DESCRIPTION OF REFERENCE NUMERALS

10: first substrate
20: first electrode
30: light conversion unit
40: second electrode
50: second substrate
1: light path control member
200: display panel
300: first coupling member
400: polarizing film
500: second coupling member The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A light path control member, comprising:
a first substrate;
a first electrode disposed on the first substrate;
a light conversion unit disposed on the first electrode, the light conversion unit including:
    a plurality of light transmitting parts spaced apart from each other,
    a high refractive part disposed between adjacent ones of the plurality of light transmitting parts, and
    a transmittance variable part between the light transmitting part and the high refractive part;
a second electrode disposed on the light conversion unit; and
a second substrate disposed on the second electrode,
wherein light transmittance of the transmittance variable part is changed based on voltage.

2. The light path control member of claim 1, wherein the light conversion unit is disposed between the first electrode and the second electrode.

3. The light path control member of claim 1, wherein a refractive index of the high refractive part is greater than a refractive index of the light transmitting part.

4. The light path control member of claim 1, wherein the transmittance variable part includes a dispersion solution and light absorbing particles in the dispersion solution.

5. The light path control member of claim 4, wherein in a first mode, the light absorbing particles are dispersed in the dispersion solution,
wherein in the first mode, the transmittance variable part blocks light incident by dispersion of the light absorbing particles.

6. The light path control member of claim 5, wherein in the first mode, no voltage is applied to each of the first electrode and the second electrode.

7. The light path control member of claim 6, wherein in a second mode, an alignment direction of the light absorbing particles are changed.

8. The light path control member of claim 7, wherein in the second mode, the voltage of a first polarity is applied to the first electrode, and the voltage of a second polarity different from the first polarity is applied to the second electrode.

9. The light path control member of claim 8, wherein the alignment direction of the light absorbing particles of the transmittance variable part is changed according to a magnetic field formed by the first electrode and the second electrode.

10. The light path control member of claim 9, wherein the transmittance variable part is variable in transmittance according to the alignment direction of the light absorbing particles.

11. The light path control member of claim 8, wherein a refractive index of the dispersion solution is smaller than a refractive index of the high refractive part and greater than a refractive index of the light transmitting part.

12. The light path control member of claim 1, wherein an opening extending from an upper surface in a thickness direction is formed in the light transmission part, and the transmittance variable part is disposed within the opening.

13. The light path control member of claim 1, wherein the transmittance variable part is disposed between the light transmitting part and the high refractive part.

14. The light path control member of claim 1, wherein the second electrode contacts an upper surface of the transmittance variable part, and an upper surface of the light transmitting part, and an upper surface of the high refractive part, respectively.

15. A display device, comprising:
a display panel; and
a light path control member on the display panel,
wherein the light path control member comprises:
    a first substrate;
    a first electrode disposed on the first substrate;
    a light conversion unit disposed on the first electrode, the light conversion unit including:
    a plurality of light transmitting parts spaced apart from each other,
    a high refractive part disposed between adjacent ones of the plurality of light transmitting parts, and
    a transmittance variable part between the light transmitting part and the high refractive part;
    a second electrode disposed on the light conversion unit; and
    a second substrate disposed on the second electrode,
    wherein light transmittance of the transmittance variable part is changed based on voltage.

16. The display device of claim 15, wherein the light conversion unit is disposed between the first electrode and the second electrode.

17. The display device of claim 15, wherein a refractive index of the high refractive part is greater than a refractive index of the light transmitting part.

18. The display device of claim 15, wherein the transmittance variable part is disposed between the light transmitting part and the high refractive part.

19. The display device of claim 15, wherein the second electrode contacts an upper surface of the transmittance variable part, and an upper surface of the light transmitting part, and an upper surface of the high refractive part, respectively.

* * * * *